US007753309B2

(12) United States Patent
Garreau

(10) Patent No.: US 7,753,309 B2
(45) Date of Patent: Jul. 13, 2010

(54) VTOL/STOL TILT-PROP FLYING WING

(76) Inventor: Oliver Garreau, 2725 Preston Dr., Mountain View, CA (US) 94040

( * ) Notice: Subject to any disclaimer, the term of this patent is extended or adjusted under 35 U.S.C. 154(b) by 563 days.

(21) Appl. No.: 11/689,519

(22) Filed: Mar. 22, 2007

(65) Prior Publication Data
US 2009/0212166 A1 Aug. 27, 2009

(51) Int. Cl.
B64C 15/12 (2006.01)
B64C 27/22 (2006.01)
(52) U.S. Cl. .................... 244/12.4; 244/56; 244/7 R
(58) Field of Classification Search .............. 244/12.4, 244/12.1, 12.3, 12.5, 7 R, 6, 17.27, 17.25, 244/17.11, 56; D12/326–328, 335, 339, D12/340
See application file for complete search history.

(56) References Cited

U.S. PATENT DOCUMENTS

| | | | | |
|---|---|---|---|---|
| 3,017,139 | A | * | 1/1962 | Binder ...................... 244/12.6 |
| 3,049,320 | A | * | 8/1962 | Fletcher .................... 244/12.4 |
| 3,081,964 | A | * | 3/1963 | Quenzler ................... 244/7 R |
| D301,867 | S | * | 6/1989 | Street ........................ D12/339 |
| 5,454,531 | A | | 10/1995 | Melkuti |
| 5,758,844 | A | * | 6/1998 | Cummings ................. 244/7 C |
| 6,343,768 | B1 | * | 2/2002 | Muldoon .................... 244/7 R |
| 6,382,556 | B1 | | 5/2002 | Pham |
| 6,848,649 | B2 | | 2/2005 | Churchman |
| 7,118,066 | B2 | | 10/2006 | Allen |
| 2003/0094537 | A1 | | 5/2003 | Austen-Brown |
| 2004/0026563 | A1 | | 2/2004 | Moller |
| 2004/0232279 | A1 | | 11/2004 | Melkuti |
| 2005/0127238 | A1 | | 6/2005 | Ballew |
| 2005/0151003 | A1 | | 7/2005 | Churchman |
| 2005/0230519 | A1 | | 10/2005 | Hurley |
| 2006/0032970 | A1 | | 2/2006 | Allen |
| 2006/0032971 | A1 | | 2/2006 | Baldwin |

* cited by examiner

Primary Examiner—Tien Dinh
(74) Attorney, Agent, or Firm—Richard B. Cates

(57) ABSTRACT

An aircraft comprises two wings, a fuselage, a tail planform and a pair of counter-rotating propellers. The two wings are located at a longitudinal center of gravity of the aircraft. The fuselage is located forward of the longitudinal center of gravity and coupled to the two wings. The tail planform is coupled to the two wings and located aft of the longitudinal center of gravity. The pair of counter-rotating propellers are located at the longitudinal center of gravity and between the wings. Further, the pair are coupled to a tilting mechanism for tilting the propellers between a vertical flight position and a forward flight position. One of the propellers located beneath the wings when in the vertical flight position and one of the propellers is located above the wings when in the vertical flight position.

9 Claims, 7 Drawing Sheets

VTOL/STOL TILT-PROP FLYING WING

TECHNICAL FIELD

This invention relates generally to aircraft, and more particularly, but not exclusively, provides a Vertical Takeoff or Landing (VTOL)/Short Takeoff or Landing (STOL) aircraft having tilt propellers and a flying wing.

BACKGROUND

Over the last 60-year period, countless attempts have been made to design VTOL machines outside the realm of the standard helicopter configuration, but only a handful of configurations proved reliable and were only limited to some military or marginal applications. The VTOL developments, that have been trying to go beyond the limitations of the standard helicopter, have indeed failed quite systematically and never entered any commercial applications.

While helicopters tend to have excellent VTOL performance, their cruise speed tends to be limited. The Harrier Jump Jet was developed to enable VTOL performance with a higher cruise speed. However, the Harrier tended to be expensive to operate and top speed was nonetheless limited considering the power plant it incorporated. Similarly the V22 Osprey was developed and had initially stability problems, which has led to multiple crashes. It still does not offer great recovery capability in case of power failure or rotor failure.

Accordingly, a new aircraft configuration is disclosed here that is capable of VTOL/STOL operation with a relatively high cruise speed yet is safer to operate.

SUMMARY

Disclosed is an aircraft architecture enabling a unique solution to VTOL and STOL operation, relying on a fixed-pitch and tilt-prop configuration in one embodiment. Such aircraft is also called a Convertiplane (CVTP). Special consideration and focus were given to the transition phase and the management of the center of gravity (CG) when the Convertiplane converts from vertical flight to horizontal flight (level flight), providing a safe and neutral flight behavior.

Special attention was given to the flight safety thanks to a "natural stability" and landing capability similar to the autorotation available in helicopters.

Finally embodiments of the invention also address solutions for high-speed performance, ease and optimized cost of manufacture.

In an embodiment, the aircraft comprises two wings, a fuselage, a tail planform and a pair of counter-rotating propellers. The two wings are located at the longitudinal center of gravity of the aircraft. The fuselage is located forward of the longitudinal center of gravity and coupled to the two wings. The tail planform is coupled to the two wings and located aft of the longitudinal center of gravity. The pair of counter-rotating propellers are located at the longitudinal center of gravity and between the wings. Further, the pair are coupled to a tilting mechanism for tilting the propellers between a vertical flight position and a forward flight position. One of the propellers located beneath the wings when in the vertical flight position and one of the propellers is located above the wings when in the vertical flight position.

In an embodiment, a method of flying an aircraft comprises: tilting a pair of propellers of the aircraft to between a vertical and a horizontal flight position; and causing the pair of propellers to rotate, thereby causing the aircraft to climb at an angle (STOL mode).

In an embodiment, a method of flying an aircraft comprises: tilting a pair of propellers of the aircraft to a vertical flight position; and causing the pair of propellers to rotate, thereby causing the aircraft to either hover or to climb vertically (VTOL mode).

In an embodiment of the invention, the methods disclosed above further comprise tilting the pair of propellers to the forward flight position, thereby causing the aircraft to fly forward (Level Flight mode).

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Figure 1:
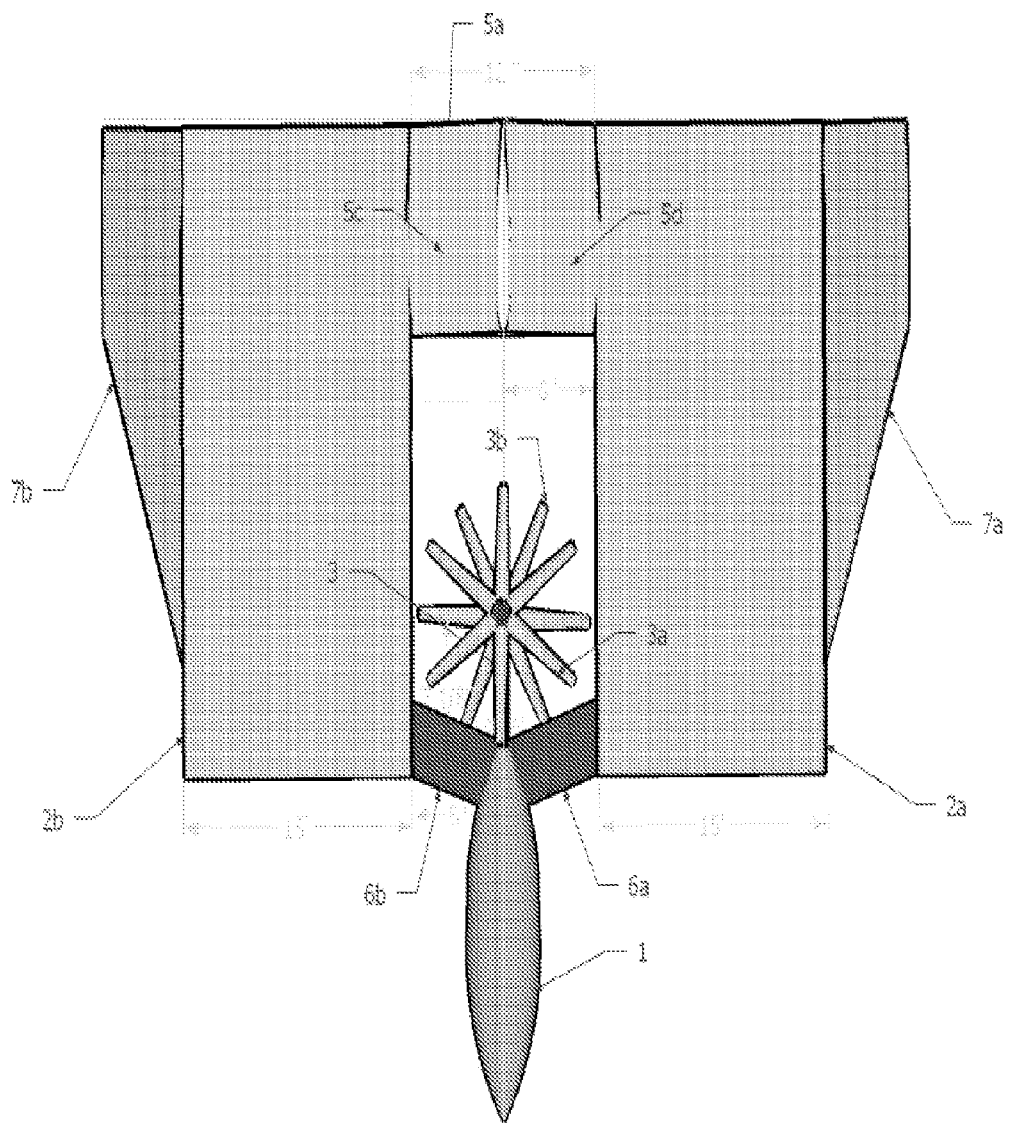
FIG. 1 is a top view of an aircraft according to an embodiment of the invention.
Figure 2:
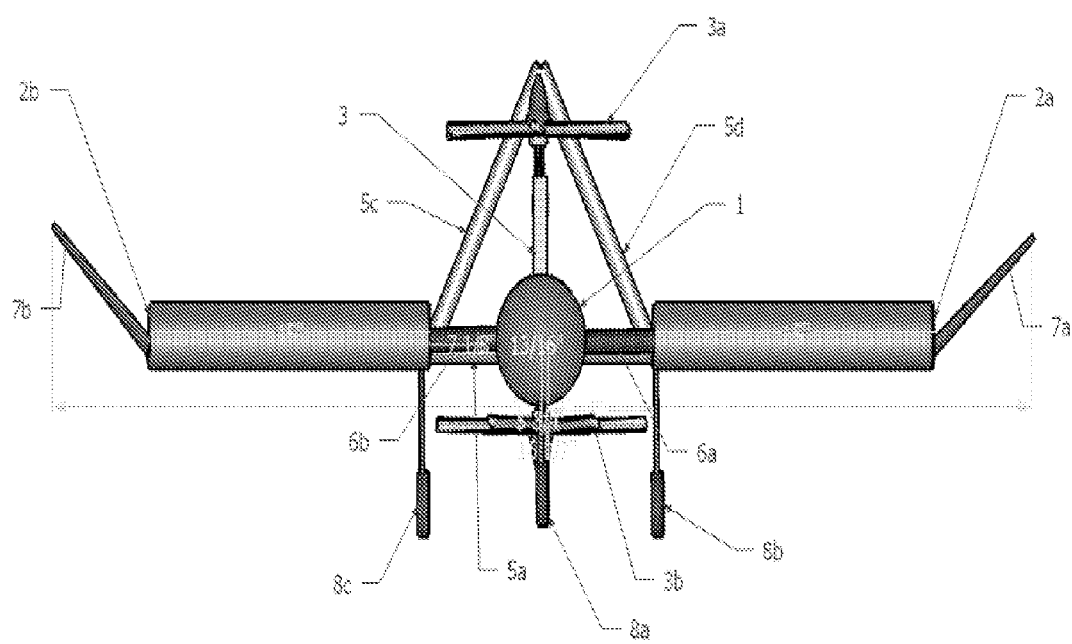
FIG. 2 is a front view of the aircraft.
Figure 3:
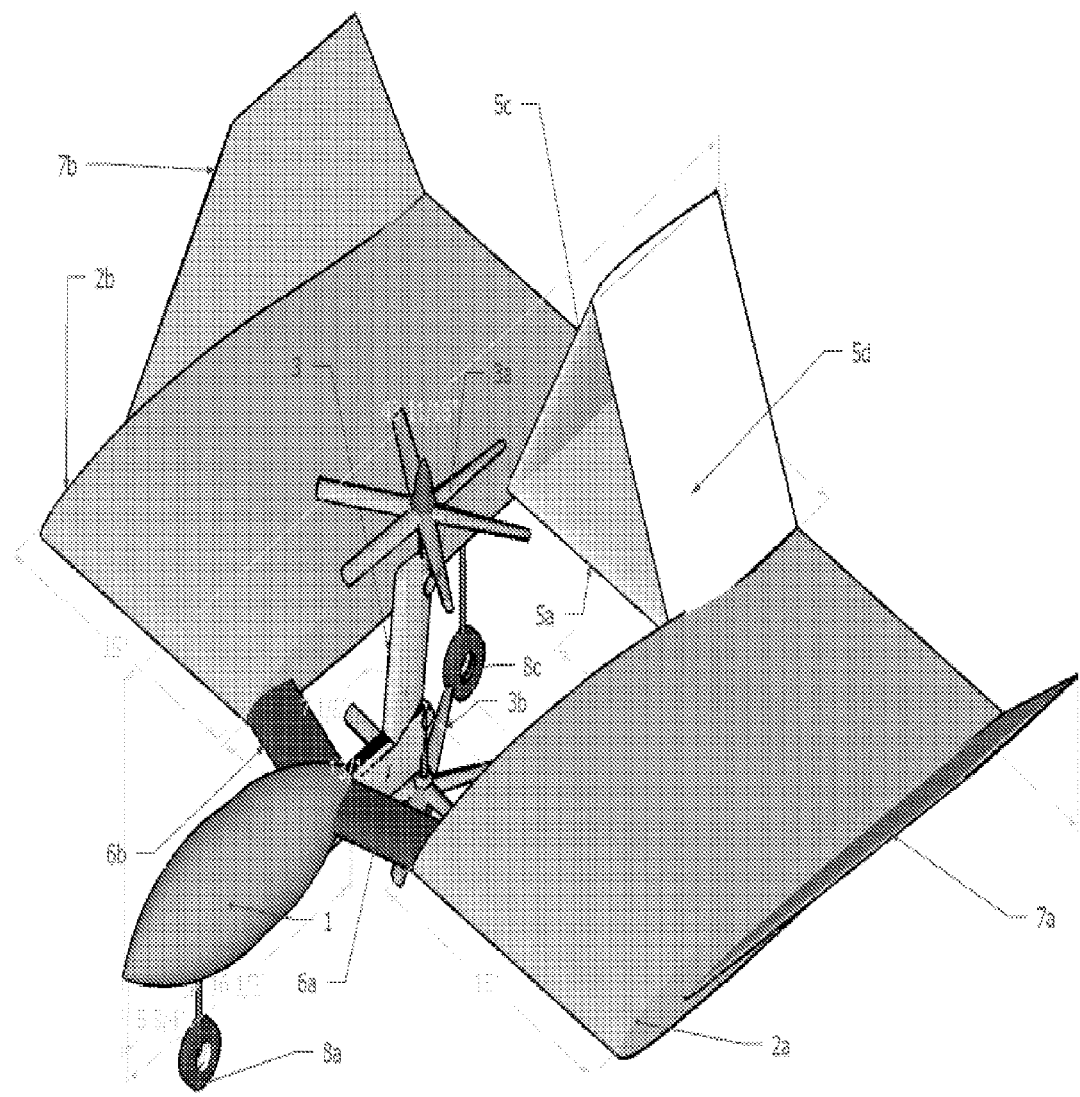
FIG. 3 is an isometric view of the aircraft.
Figure 4:
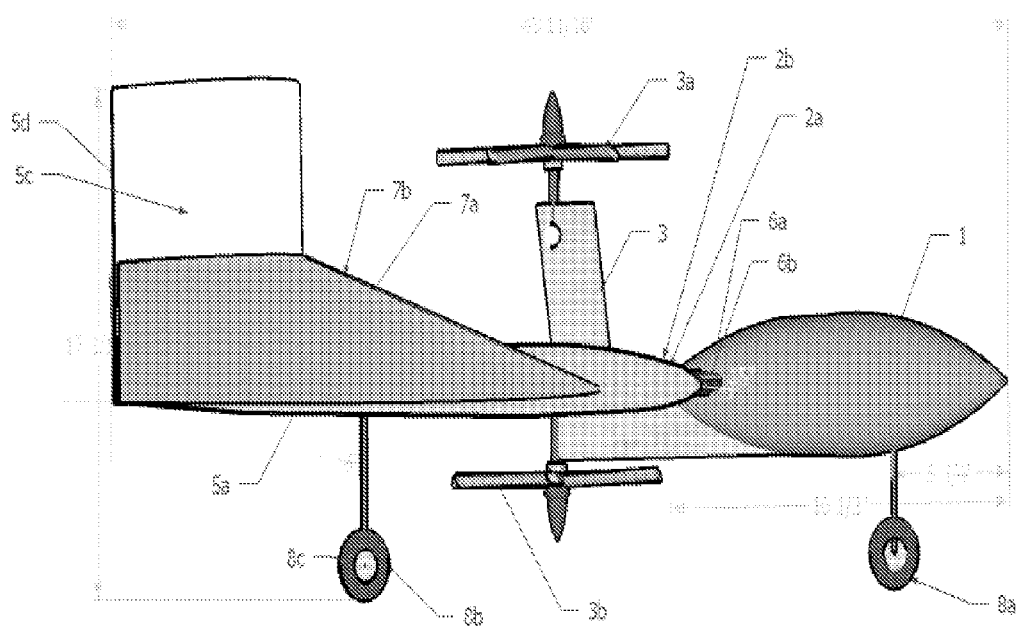
FIG. 4 is a side view of the aircraft.
Figure 5:
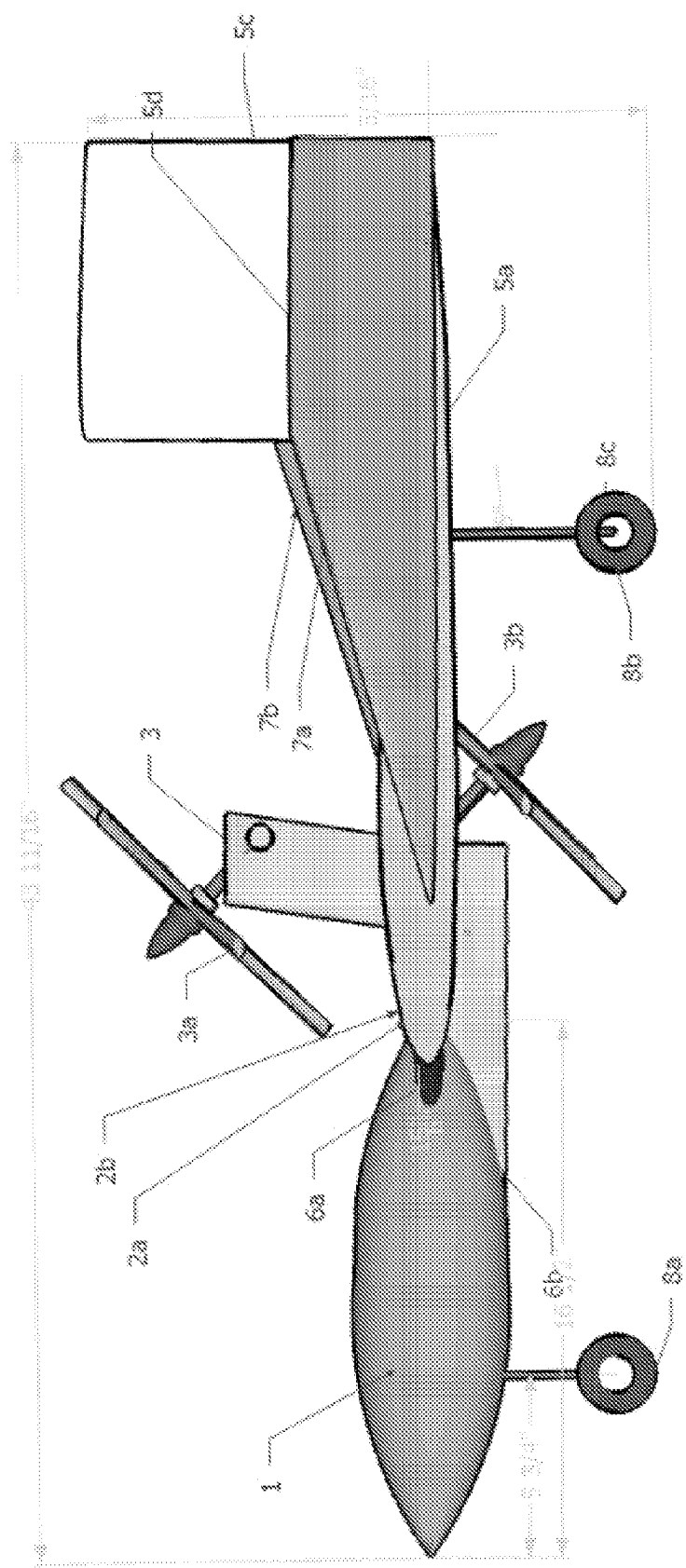
FIG. 5 is a side view of the aircraft with the propellers transitioning to a position for forward flight.
Figure 6:
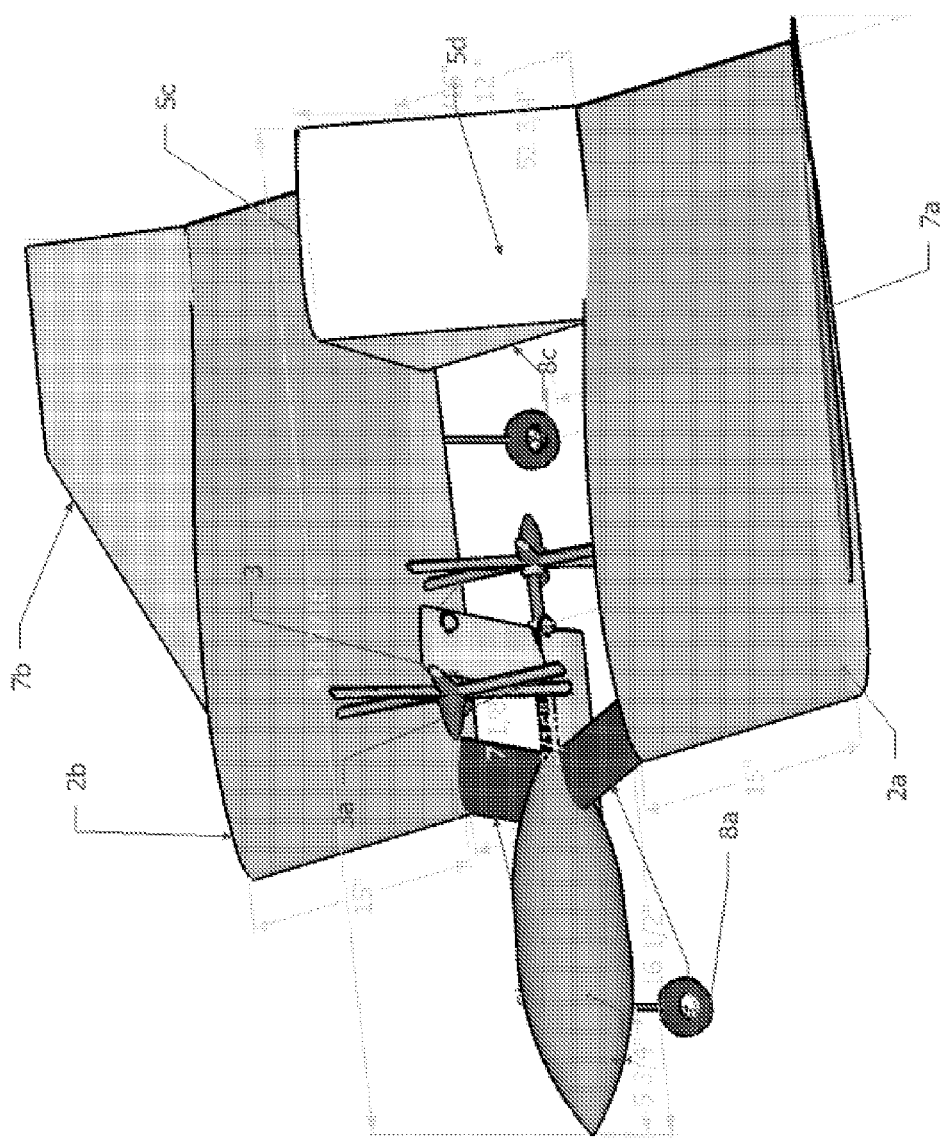
FIG. 6 is an isometric view of the aircraft with the propellers in position for forward flight.
Figure 7:
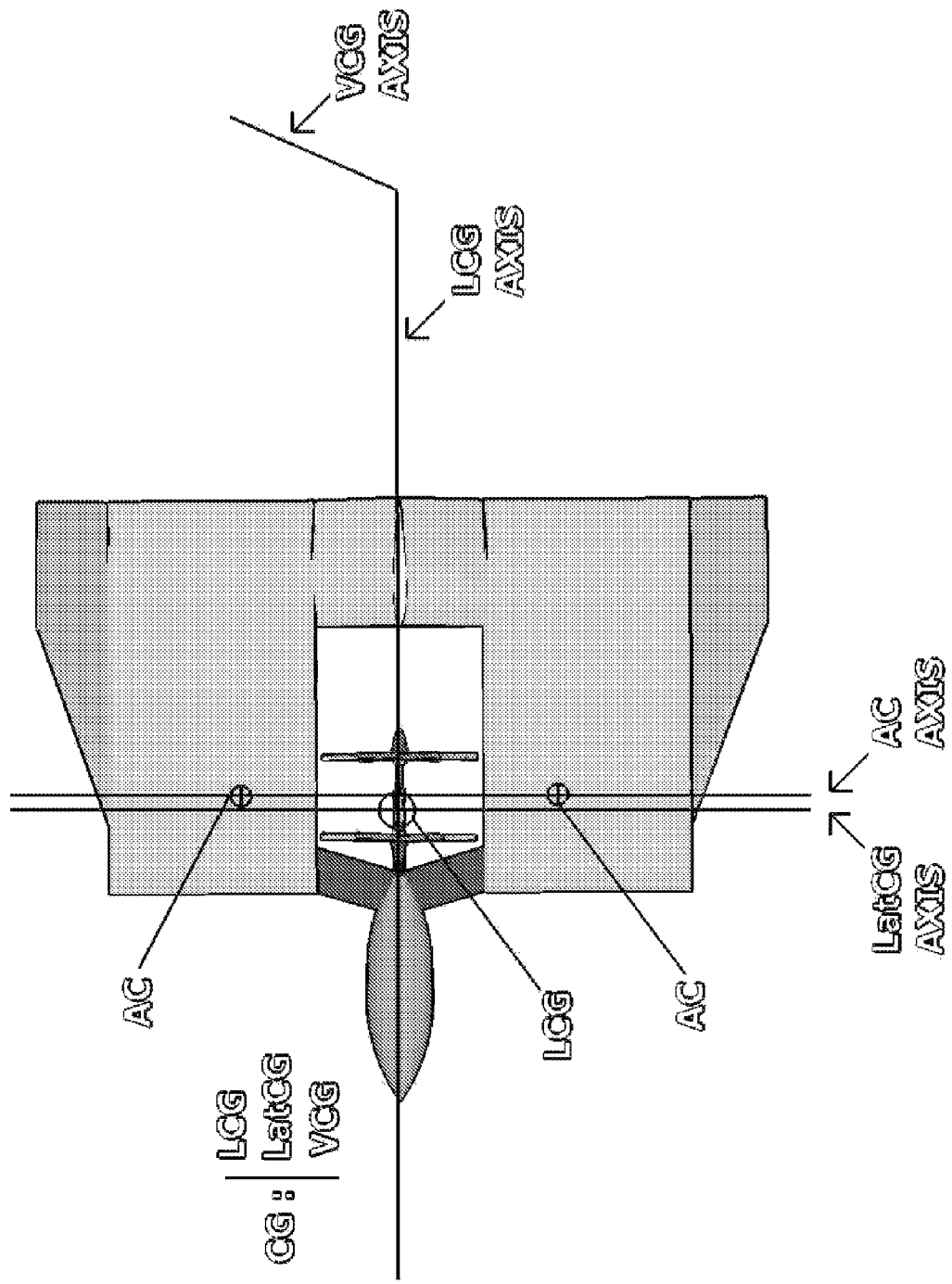
FIG. 7 is a top view of the aircraft illustrating a center of gravity (CG), longitudinal center of gravity (LCG), LCG axis and aerodynamic center (AC).

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

The aircraft comprises a fuselage 1 installed in front of the aircraft's Longitudinal Center of Gravity (LCG); two half-wings 2a and 2b (e.g., wings) clearing the vertical thrust area placed at the LCG; one vector thrust system 3 that can convert from vertical to horizontal thrust, based on two Counter-rotating tilt propellers 3a & 3b; one fixed power plant 4 driving both propellers through a gear-box 4a or 2 identical power plants 4b and 4c that can also be tilt-engines.

Placed aft of the LCG is a tail planform configuration 5 made of two horizontal stabilizers and two vertical stabilizers 5c & 5d. In an embodiment, the four stabilizers form a box conformation. In another embodiment, one horizontal stabilizer 5a and two inclined vertical stabilizers 5c & 5d form an inverted triangle configuration (inverted V configuration), A set of planforms 6a & 6b connect the fuselage and thrust system to the front section of the 2 half wings.

In an embodiment, a set of winglets 7a & 7b extended over the 2 half wings 2a &2b. The winglets can be inclined at an angle ranging from about 40 degrees to about 80 degrees, in particular 50 degrees. The winglets 7a and 7b act to augment lift and lateral stability while causing only a reasonably small drag increase.

The fuselage 1 may carry a pilot, passenger(s) and/or other payload(s), such as instrumentation and flight control electronics. In an embodiment, the fuselage 1 carries the main front landing gear 8a. It is not recommended to carry weight-shifting loads (like fuel or any jettison) in the fuselage 1 as the aircraft is aiming at a constant LCG location throughout his travel.

The general wing configuration of those two half wings 2a and 2b is one of a "flying wing", e.g., with an airfoil of a type "reflexed" or qualified as zero- (or close-to-zero-) pitching moment. This wing has a relatively high surface, has a high lift coefficient (CL), a relatively small thickness-to-cord ratio, also called T/C ratio (typically below about 8%) and a short aspect ratio, AR, which is typically the half wing length divided by the cord length (in one embodiment, as low as 50%).

These wings 2a and 2b also carry rear landing gears 8b and 8b and fuel tanks.

At the aircraft's LCG is a pair of propellers 3a & 3b, multi-bladed (e.g., three blades) and with fixed pitch. In an embodiment, the propellers 3a and 3b are variable pitch. The propellers 3a and 3b are counter-rotating to cancel each other's torque out in vertical flight mode. In this mode, yaw control will be done with changing the relative rotating speed and/or relative pitch but it is not advised to use differential and variable pitch since it would defeat the ease of construction for a fixed-pitch propeller solution.

To cancel the resulting torque, the two propellers always rotate in a counter-rotating mode. The upper prop (above the 2 half wings) is working as a puller prop. The lower prop (underneath the 2 half wings) is working as a pusher prop. The CVTP dual-propeller system is permanently working in a puller/pusher mode in all regimes of flight in one embodiment.

In an embodiment, for stable vertical flight that both the thrust lines of each propeller are the same and vertical and that the line intersect with the craft's CG. This condition actually mandates that each propeller shaft 3d & 3e would be typically aligned with one another in vertical flight mode.

In an embodiment, the aerodynamic center (AC) of the two half wings is placed at or slightly aft of aircraft's CG. In that flight configuration, best thrust efficiency is when the 2 propellers are tilted so that their thrust lines are parallel to the flight line.

In an embodiment, the thrust lines of the two propellers 3a and 3b when in vertical flight mode, the aircraft's CG and the aerodynamic center (AC) be all aligned. In an embodiment, this alignment point is located at about 25% of the cord, from the leading edge, which is the typical location of the AC.

In an embodiment of the invention, the CG location, and its 3 axial components Longitudinal CG, Vertical CG and Lateral CG (LCG, VCG, LatCG) are kept constant during the tilting process and throughout the duration of the flight (except VCG). As such, the aircraft can have identical mechanical propeller systems that tilt in the same proportion and at the same rate around the CG point, so that LCG and VCG remain constant throughout the tilting process and while LatCG also remain constant and typically null. Further, the variable load like the total fuel mass should be located at the LCG, being split in at least two tanks, one in each half-wing 2a and 2b, so that the center of gravity of the combined tanks (two or more) be aligned with the LCG of the aircraft. This condition guarantees that the LCG of the aircraft remains unchanged regardless of the fuel quantity. Inevitably the VCG location is always impacted by the fuel loading and consumption but has little impact on the flight characteristics due to its limited range.

In an embodiment, the overall wing conformation is one of a safe "flying wing." The set of three or four stabilizer surfaces is 'integrated' as part of the flying wing and makes a continuous planform, joining the two half wings 2a and 2b. The stabilizer system would not extend excessively aft of the trailing edge of the two half wings 2a and 2b. Still some swept-back airfoil can be found advantageous to increase the efficiency of the stabilizers. In an embodiment, the stabilizers form a box configuration with three or four stabilizers, in order to optimize the mechanical rigidity of the aft section of the aircraft. Either a Rectangular box or a Triangular box configuration is suitable. Early model simulation has also shown very smooth stall characteristics of this flying wing, due to the combined effect of the reflexed airfoil and the low wing loading.

Throughout the tilting process to horizontal mode, each planform of the aircraft is very streamlined and is static, not being part of the tilting process, each having an actual airfoil shape with low drag coefficient. Due to the absence of tilting wings, the overall lift and drag coefficients remain approximately constant and the aircraft has a neutral and predictable response to increasing air pressure as it is picking up speed. Early simulation of the forward flight mode has proven great results in term of maximum speed and flight stability, which is characteristic of a flying wing with short Aspect Ratio. Top speed will be obviously quite superior to any non-tilting-propeller, non-tilting-rotor or rotary aircraft, like the standard helicopter configuration. For best performance, a retractable landing gear is preferable.

This wing configuration would provide a low wing loading, in view of the large winged area of this flying wing. Early model simulation showed good glide capability, happening at a very low speed and quite similar to the path of a helicopter performing an auto-rotation. However, ground contact might not be as smooth as with a helicopter performing an autorotation. It is also simulated that during power-off glide, tilting the two propellers to their vertical flight position, produce additional lift and enhance the glide performance, emulating to some extend the helicopter's autorotation.

The benefit of the winglets 7a and 7b, seen from simulations, one for each half-wing 2a and 2b, is providing:
  additional lift
  additional stability at high rate of speed
  additional stability during lateral winds or during lateral translation Actually only two control surfaces are needed for this aircraft to be controlled in horizontal or forward level flight. The two half wings 2a and 2b are being operated in an "Elevon Mode". This mode combines pitch and roll control with a single pair of control surfaces. The two functions, pitch and roll, can be mixed mechanically or electronically while the resulting output is driving each control surface. This conformation largely simplifies the design of the control surface and associated drive system, compared to a standard airplane (with separate main wings and tail wings). Electronic mixing, when 'fly-by-wire' is possible, should be privileged due to its increased accuracy and reliability.

Another pair of control surface can be added to provide yaw control in level flight and can be installed on the two vertical or inclined stabilizers. This feature is actually needed for accurate flight controlled, coordinated turn and when landing with cross-winds.

In LF conformation, the thrust of the 2 propellers is parallel to the flight line.

In a configuration for short take-off and landing, the axis of the two propeller shafts would not be exactly vertical but make a small angle (typically under about 15 degrees) with the vertical line.

It should be observed that at all time and under any tilt angle the lower propeller would clear the ground in this STOL mode. This can be achieved by design, with a long-enough landing gears and proper dimensioning of the lower propeller shaft system and of the lower propeller diameter.

In STOL mode, take-off for the aircraft can happen at low speeds. It is likely that during the first moments after take-off, the main wing will be at angle-of-attach (AoA) close to zero and the wings would not produce positive lift.

The four control surfaces are then providing enough control authority and the propeller shaft can remain at a low and fixed angle versus the vertical line. Once enough horizontal speed is acquired the CVTP could transition to LF by fully tilting the 2 propellers to 90 degrees from the vertical line.

In VTOL mode, the two propeller shafts are set vertical and the thrust line is exactly perpendicular to the cord line of the 2 half-wings. In absence of any longitudinal wind, the two elevon surfaces are not able to provide any control authority. In that case, pitch authority can be provided by controlling the thrust axis relative to the vertical line. An additional set of louvers (also called vanes) can be added at the inner edge of the half-wing to provide roll authority. Yaw control is here provided by differential torque control in the two counter-rotating propellers.

However it was simulated that in this VTOL mode and with normal control surfaces, typically 16% of the cord length, the aircraft is properly controlled in pitch and roll thanks to a light frontal wind of a couple of knots. Thanks to the oversized tail stabilizer, the aircraft will orientate itself naturally into the head wind, then the two elevon surfaces are providing enough control authority in pitch and roll.

Additional control with edge louvers and pitch control for the propeller system is not needed, provided enough head wind is being sustained. If no head wind at all is present, nor the additional pitch and roll system, STOL mode will be preferable.

The aircraft is capable of hovering with a very natural stability and in an intuitive manner but once 2 conditions are being met:
 the longitudinal axis of the aircraft (so aligned with the fuselage) should be facing the head wind or dominant wind for all of the control surfaces (elevon and stabilizers) to be effective.
 The head wind needed to be of sufficient strength, as a perfect calm could be found less suitable for hovering.

Once those 2 conditions are met, hovering in the aircraft is quite stable and require quite less a workload versus hovering in a standard helicopter.

The aircraft in hover mode removes one dimension of control as there is no need to control the yaw that much, the head wind providing a natural alignment. This configuration is not as flexible though versus a helicopter that can hover in any heading.

A light headwind is needed, although it provides hardly any lift for the overall craft, but as it is providing a way to stabilize very naturally the aircraft in all 3 axes (pitch, yaw and roll). Pilot workload is quite reduced compared to one expected in a helicopter.

Hovering height, relative to the ground, is simply controlled by the power applied to the thrust system, here no complex collective control mechanism, like in a heli, is needed.

The foregoing description of the illustrated embodiments of the present invention is by way of example only, and other variations and modifications of the above-described embodiments and methods are possible in light of the foregoing teaching. For example, the aircraft can include alternative or additional thrust sources, such as jets, rockets, etc. The embodiments described herein are not intended to be exhaustive or limiting. The present invention is limited only by the following claims.

What is claimed is:

1. An aircraft, comprising:
 two half wings separated and placed along a Longitudinal Center of Gravity axis (LCG Axis) of the aircraft;
 a fuselage located forward of the longitudinal center of gravity (LCG) and coupled to the two half wings;
 a tail planform coupled to the two wings and located aft of the longitudinal center of gravity; and
 a pair of counter-rotating propellers located at the longitudinal center of gravity and between the wings, the pair coupled to a tilting mechanism for tilting the propellers between a vertical flight position and a forward flight position;
 a horizontal stabilizer wing that is part of the tail planform and located at the same level, in the same plane as the 2 half wings.

2. The aircraft of claim 1, wherein the two half wings have an approximately zero pitching moment, so built with an airfoil of the type "reflex", used in flying wing aircraft.

3. The aircraft of claim 1, wherein the two half wings are coupled with the horizontal stabilizer wing, thereby forming a continuous planform.

4. The aircraft of claim 3, wherein the 2 vertical stabilizer wings and the horizontal stabilizer wing form or a triangular inverted V shape.

5. The aircraft of claim 1, wherein the aircraft is configured such that the three components of the overall center of gravity, LCG, LatCG, VCG, remain constant during the propellers tilting process.

6. A method of flying an aircraft, comprising:
 having a pair of propellers;
 two half wings placed along the longitudinal center of gravity axis of the aircraft;
 a fuselage located forward of the longitudinal center of gravity and coupled to the two wings;
 a tail planform coupled to the two wings and located aft of the longitudinal center of gravity;
 a horizontal stabilizer wing that is part of the tail planform and located at the same level, in the same plane as the 2 half wings; and
 wherein the propellers include a pair of counter-rotating propellers located at the longitudinal center of gravity and between the wings, the pair coupled to a tilting mechanism for tilting the propellers between the vertical flight position and a forward flight position
 said method of flying comprising:
 tilting the pair of propellers of the aircraft to a vertical flight position and causing a pair of propellers to rotate, thereby causing the aircraft to climb vertically.

7. The method of claim 6, further comprising:
 tilting the propellers to the vertical flight position during a power failure, allowing the two propellers to auto-rotate to produce additional lift; and
 gliding the aircraft to a landing.

8. The method of claim 6, wherein the three components of the overall center of gravity, LCG, LatCG, VCG, remain constant during the propellers tilting process.

9. A method of taking off with an aircraft, comprising:
 having a pair of propellers; two half wings placed along the axis of longitudinal center of gravity of the aircraft;
 a fuselage located forward of the longitudinal center of gravity and coupled to the two half wings;

a tail planform coupled to the two half wings and located aft of the longitudinal center of gravity;

a horizontal stabilizer wing that is part of the tail planform and located at the same level, in the same plane as the 2 half wings; and wherein the propellers include a pair of counter-rotating propellers located at the longitudinal center of gravity and between the wings, comprising steps of tilting the pair of propellers of the aircraft so that thrust vector forms an angle of less than about 15 degrees from the vertical and causing the pair of propellers to rotate, thereby causing the aircraft to take off in a short distance in STOL mode.

* * * * *